(12) United States Patent
Wang et al.

(10) Patent No.: US 8,478,982 B2
(45) Date of Patent: Jul. 2, 2013

(54) MEDIA ACCESS CONTROL SECURITY MANAGEMENT IN PHYSICAL LAYER

(75) Inventors: Wei (David) Wang, Cupertino, CA (US); Daniel Tai, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 724 days.

(21) Appl. No.: 12/561,856

(22) Filed: Sep. 17, 2009

(65) Prior Publication Data

US 2011/0035580 A1 Feb. 10, 2011

Related U.S. Application Data

(60) Provisional application No. 61/231,753, filed on Aug. 6, 2009.

(51) Int. Cl.
*H04L 29/06* (2006.01)
(52) U.S. Cl.
USPC .......................................................... 713/151
(58) Field of Classification Search
USPC ....................................... 713/151; 726/26, 27
See application file for complete search history.

(56) References Cited

U.S. PATENT DOCUMENTS

| | | | | |
|---|---|---|---|---|
| 6,493,804 | B1 * | 12/2002 | Soltis et al. | 711/152 |
| 2003/0007508 | A1 * | 1/2003 | Sala et al. | 370/468 |
| 2005/0248364 | A1 * | 11/2005 | Vadi et al. | 326/39 |
| 2007/0073824 | A1 * | 3/2007 | Choo et al. | 709/208 |
| 2008/0115203 | A1 * | 5/2008 | Elzur | 726/12 |
| 2010/0229013 | A1 * | 9/2010 | Diab et al. | 713/323 |

OTHER PUBLICATIONS

Akashi Sato, High-Speed Parallel Hardware Architecture for Galois Counter Mode, Jul. 2007, IEEE, 1-4244-0921-7/07, 1863-1866.*
IEEE Standard for Local and Metropolitan Area Networks, IEEE Std 802.1 AE-2006, Media Access Control (MAC) Security, IEEE Computer Society, Aug. 16, 2006, 154 pages.

* cited by examiner

*Primary Examiner* — Peter Shaw
(74) *Attorney, Agent, or Firm* — Brake Hughes Bellermann LLP

(57) ABSTRACT

A media access control (MAC) security (MACsec) function block may implement MACsec protocols on a network. A physical layer device (PHY) may connect to the MACsec function block and an interface register configured to store command information for the MACsec function block. A central processing unit (CPU) may provide the command information for the MACsec function block to the PHY via a management data input/output (MDIO) bus. The PHY may execute either a read command or a write command against the MACsec function block based on the command information, receive, from the MACsec function block, a response corresponding to the execution of the read command or write command against the MACsec function block, and provide the response to the CPU via the MDIO bus.

23 Claims, 3 Drawing Sheets

MEDIA ACCESS CONTROL SECURITY MANAGEMENT IN PHYSICAL LAYER

PRIORITY CLAIM

This application claims priority to U.S. Provisional Application Ser. No. 61/231,753, filed on Aug. 6, 2009, entitled "MEDIA ACCESS CONTROL SECURITY IN PHYSICAL LAYER," hereby incorporated by reference.

TECHNICAL FIELD

This description relates to managing media access control security in the physical layer.

BACKGROUND

The Institute of Electrical and Electronics Engineers (IEEE) 802.1AE standard is the media access control (MAC) security standard, commonly referred to as MACsec. MACsec defines connectionless data confidentiality and integrity for media access independent protocols. MACsec defines protocols to be met to implement security requirements for protecting data traversing networks, such as Ethernets and local area networks (LANs). The MACsec infrastructure may allow for data confidentiality, data integrity, and data origin authentication. For example, MACsec may allow for unauthorized LAN connections to be identified and excluded from communication within the network.

MACsec, when implemented into existing networks, is commonly implemented on either layer 2 (data link layer) and/or layer 3 (network layer) devices from the Open Systems Interconnection Reference Model (OSI model), such as switches and/or network controllers. Implementing MACsec into existing networks may require replacing the existing hardware of the network.

SUMMARY

Systems and a method for managing media access control security in a physical layer are provided. The details of one or more implementations are set forth in the accompanying drawings and the description below. Other features will be apparent from the description and drawings, and from the claims.

DETAILED DESCRIPTION

Figure 1:
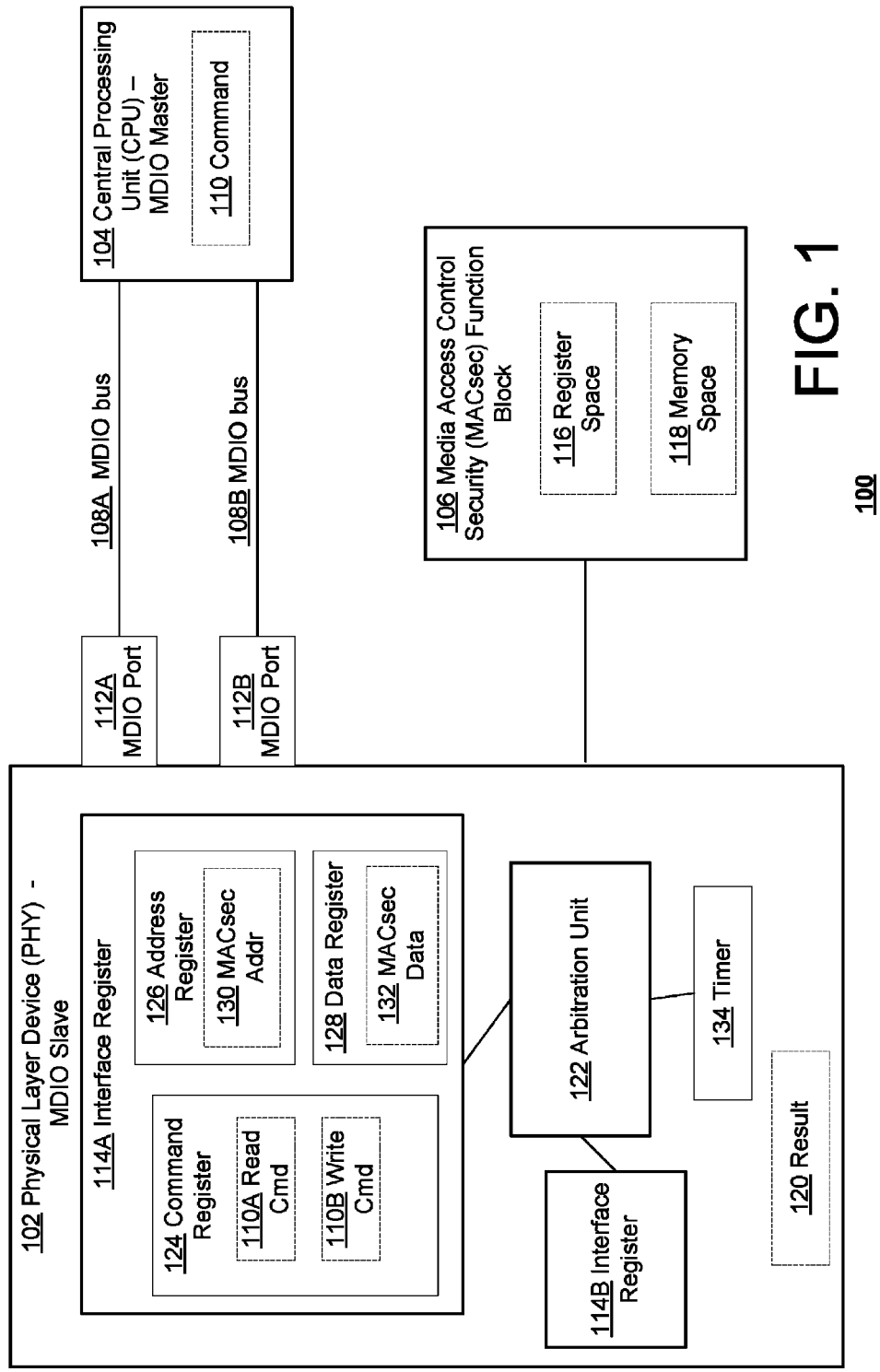
FIG. 1 is a block diagram of an example system that manages media access control security (MACsec) on a physical layer device of a network.

FIG. 1 is a block diagram of an example system 100 that manages media access control security (MACsec) on a physical layer device of a network. The physical layer device may include any device that operates on a lower layer of a network model, such as the Open Systems Interconnect network model (OSI model). The OSI model is an abstract description for layered communications in computer networks and in most forms currently includes seven primary layers, wherein each layer includes a collection of conceptually similar functions that provides services to the layer above it and receives services from the layer below it. In other example embodiments, various layers of the OSI model may be combined as treated as a single layer and/or separated as different layers, thus the seven layers referenced are for exemplary purposes only.

The lowest three layers of the OSI model include the physical layer (layer 1), the data link layer (layer 2) and the network layer (layer 3). The physical layer defines electrical and physical specifications for devices, including a relationship between a device and a physical medium. The data link layer provides for the transfer of data between network entities and error correction. The network layer provides for the transfer of variable length data from a source to a destination via one or more networks.

Media access control (MAC) provides a data communication protocol and is a sub-layer of the data link layer. MACsec may provide security (or additional security), such as data confidentiality, data integrity, and data origin authentication, on a network for the MAC and is ordinarily implemented on the data link layer of the OSI model.

In traditional network models, physical layer devices, such as PHYs, may communicate with management devices, such as central processing units (CPUs), via a serial management interface such as a management data input/output (MDIO) protocol. The MDIO protocol may provide, for example, a standardized access method to registers of the PHY devices. The MDIO protocol may provide for a MDIO bus that carries messages and data from the management device to the PHY device, and vice versa. For example, a CPU (operating as a MDIO master) may issue a write command and data to be written to the internal register of the PHY to the PHY device (operating a MDIO slave) via the MDIO bus. Then for example, upon completion of the write command the PHY device may provide the CPU with a confirmation or completion acknowledgement via the MDIO bus.

The MDIO bus may include a bus structure defined for Ethernet protocols, and may include the protocols or specifications provided by IEEE 802.3. The MDIO bus may include various features, associated with providing the standardized access to the registers of a PHY device, that cause MACsec to be implemented on the data link or network layer devices rather than the physical layer device in traditional network systems. For example, the MDIO protocol provides that the MDIO bus includes 5 bits of address space by which the CPU may access up to 32 registers of a PHY device. The MDIO protocol may also provide that the registers include up to 16 bits of register data width that may be transferred via the MDIO bus. These features of the MDIO protocol, along with the latency and bottlenecking that would occur with the usage of only a single MDIO bus in a network system, provide unacceptable impediments to implementing MACsec in the physical layer or with a physical layer device.

The system 100 however overcomes these limitations, while still working within the confinements of the MDIO protocol, and is configured to implement MACsec on a physical layer device (PHY) 102. The system 100 may include various features that provide for the management of MACsec on the PHY 102 such as indirect access between a central processing unit (CPU) 104 and a MACsec function block 106, and two or more MDIO buses 108A and 108B operating in parallel between the PHY 102 and the CPU 104.

It may be advantageous to implement MACsec on the PHY 102 (e.g., a physical layer device) rather than on a data link or network layer device. Implementing MACsec on the PHY 102 may allow MACsec to be implemented within or on existing networks without changing the already existing network switches or controllers. For example, if MACsec is implemented on a multilayer Ethernet switch (e.g., on the network layer) of an existing network, then the other Ethernet switches would each have to be configured to implement MACsec, which could be a costly process. Additionally, different networks often use different switches, which means that each different type of switch would need its own configuration to implement MACsec. By contrast, PHY devices (e.g., 102) operate using similar standards and implementing MACsec on PHY devices, as shown in system 100, may be a much easier process.

The block in FIG. 1 will be briefly described, followed by a description of its overall operation. Referring to FIG. 1, system 100 may include a Central Processing Unit (CPU) 104 that may provide overall control of system 100, and may operate as a MDIO master. A Media Access Control Security (MACsec) function block 106 is also provided, and may provide MACsec functionality and/or the additional resources required by PHY 102 to implement MACsec functionality on a network. This MACsec functionality may include functions related to data confidentiality, data integrity, data origin authentication and/or other security related functions. The MACsec function block 106 may include the resources required by the MACsec standard (e.g., to implement MACsec on a physical layer device), for example, the MACsec function block 106 may include a register space 116, and a memory space 118, which are described in greater detail below.

System 100 may also include a Physical Layer Device (PHY) 102, which may operate as a MDIO slave. PHY 102 may be similar to the PHY devices discussed above, and may include any type of PHY device. PHY 102 may include multiple MDIO ports, such as MDIO ports 112A and 112B. PHY device 102 may be coupled to CPU 104 via MDIO ports 112A and 112B and may receive commands 110 over MDIO buses 108A and 108B, respectively.

The PHY 102 may include any device configured to operate on a lower level or layer of a network model, such as the physical layer of the OSI model. The PHY 102 may include a PHY device, similar to the PHY devices discussed above. In the system 100, the PHY 102 may operate as a MDIO slave and receive a command 110 from the CPU 104 (operating as a MDIO master) via one of the MDIO buses 108A, 108B.

PHY 102 (as MDIO slave) may include interface registers 114A and 114B, which may provide an interface between the CPU 102 (as MDIO master) and the MACsec function block 106. The interface registers 114A and 114B may be of the same structure (each having the same sub-blocks). Therefore, the details or sub-blocks are shown only for interface register 114A, and it is understood that the structure of interface register 114B is the same as interface register 114A. The interface registers 114A, 114B may include standard PHY 102 registers that are compatible with the MDIO standard (e.g., including the MDIO ports 112A, 112B and the MDIO buses 108A, 108B). For example, the interface registers 114A, 114B may be standard registers that are directly accessible to the CPU via the MDIO buses 108A, 108B (e.g., when the CPU provides the command 110 or other information to the PHY 102).

The interface register 114A may include multiple registers. For example, the interface register 114A may include a command register 124, an address register 126 and a data register 128. The command register 124 may store whether the command 110 includes a read command 110A or a write command 110B. The address register 126 may store a MACsec address 130 corresponding to a register space 116 and/or memory space 118 from the MACsec function block 106. The data register 128 may include MACsec data 132 that is to be written to (in the case of write commands 110B) and/or data read from (in the case of read commands 110A) the MACsec function block 106.

The operation of the system 100 will now be described in greater detail. The CPU 104 may issue a command 110 to the PHY 102 via the MDIO bus 108A, which may be received at the MDIO port 112A. The MDIO port 112A may be associated with or connected to the interface register 114A, in which the command 110 may be stored in the command register 124 as the write command 110B. The write command 110B may indicate that data is to be written to a register, memory or other location.

The write command 110B may include or otherwise be provided with the data (e.g., MACsec data 132) to be written, the length of the data to be written, the address (e.g., MACsec address 130) where the data is to be written, and the command 110B to actually write the data. This information may be provided by the CPU 104 to the PHY 102 in adherence with the MDIO protocol, using one or more iterations or transmissions of the MDIO bus 108A.

The CPU 104 may issue a read command 110 to the PHY 102. Similar to the write command 110B, the read command 110A may include the address from where the data is to be read, the length of the data to be read and the command to actually read data, all of which may be stored in the interface register 114A. As will be discussed below, the read command 110A may include a burst read command where multiple addresses may be read by issuing a single read command 110A. In other example embodiments, the command 110 may include additional information other than that discussed above.

The CPU 104 may provide the command 110 to PHY 102 via one or both of the MDIO buses 108A, 108B. The MDIO buses 108A, 108B may include any serial bus that operates to provide a management interface, such as the MDIO bus as discussed above, including the above discussed limitations. Though traditional systems may include only one serial MDIO bus 108A, the system 100 may include two or more MDIO buses, configured to operate in parallel, this may ease the congestion/bottlenecking problem discussed above. Enabling the system 100 with the two MDIO buses 108A, 108B may include additional functionality as provided by the arbitration unit 122. Each MDIO bus 108A, 108B may be configured to transfer data between the PHY 102 and the CPU 104, while the arbitration unit 122 may regulate access to the MACsec function block 106 to ensure data integrity of the data stored in the MACsec function block 106 when two or more commands 110 try to gain simultaneous access to the register space 116 and/or memory space 118.

The command 110 from the CPU 104 may be received by the PHY 102 at either MDIO port 112A or 112B, depending upon which MDIO bus 108A or 108B it was transmit. The MDIO ports 112A, 112B may include a physical interface by which the PHY receives and/or transmits data (including the command 110) via the MDIO buses 108A and 108B, respectively. Each MDIO port 112A, 112B may be associated with, correspond to or otherwise be connected to an interface register 114A, 114B. The interface registers 114A, 114B may include the 16 bit registers of the PHY 102 compliant with the MDIO protocol, as discussed above. In the system 100 however, the interface registers 114A, 114B may provide the CPU 104 with indirect access to the MACsec function block 106 as will be discussed below while remaining compliant with the MDIO protocol.

The MACsec function block 106 may include additional storage space (e.g., register space 116 and/or memory space 118) that may be used by the PHY 102 to manage MACsec within the PHY 102. For example, as discussed above, MACsec requires access to registers and/or memory with data width not limited to 16 bits and more than the 32 registers provided via the interface registers 114A and 114B. This storage space, as required by MACsec, may be provided by the MACsec function block 106. By adding a connection between the MACsec function block 106 and the PHY 102, the standard MDIO protocol used to provide communication between the higher layer device (CPU 104) and the layer 1 device (PHY 102) may remain unchanged, while the system 100 is enabled to manage MACsec in the physical layer device.

The MACsec function block 106 may include both register space 116 and memory space 118. Both register space 116 and memory space 118 may be used to store data, and provide the PHY 102 with storage space beyond what has been allotted via the interface registers 114A and 114B. The register space 116 may include a smaller storage space that is more quickly accessible than the memory space 118. The register space 116 may be used store data to be stored in the memory space 118, data to be operated on and then placed back in memory space 118 and/or data that is repeatedly accessed. For example, in performing a data read command on the MACsec function block 106, the data that was read from the memory space 118 may be stored in the register space 116 until it is provided to the PHY 102. Or for example, during the performance of a data write command, the data to be written to the MACsec function block 106 may be stored in the register space 116 until it may be written to the memory space 118.

The interface registers 114A, 114B which may have been used in traditional systems to operate on the commands 110 provided by the CPU 104, may be used by the system 100 to provide the same functions as before but also provide an indirect access between the CPU 104 and the MACsec function block 106.

In providing indirect access between the CPU 104 and the MACsec function block 106, the system 100 provides a way of direct mapping the commands 110 received from the CPU 104 by the PHY 102, to the register space 116 and memory space 118 of the MACsec function block 106. The current MDIO protocol allocates 5 bits of address space that may map to 16 bits of register space in the interface registers 114A, 114B. MACsec however requires 32 bits of address space, rather than 5 bits, by which to address a much larger storage area (e.g., than offered by a standard interface register 114A, 114B and as provided by the MACsec function block 106). To make up for the discrepancy, the system 100 may use the address register 126 of the interface register 114A.

The address register 126 may include two register spaces from the interface register 114A, a least significant bit (LSB) register and a most significant bit (MSB) register, each of which is capable of storing 16 bits of information. The CPU 104 may then access the register space 116 and/or the memory space 118 of the MACsec function block 106 by writing a corresponding 32-bit MACsec address 130 to the address register 126 using multiple commands to the MDIO bus 108A. For example, the CPU 104 may provide the first 16 bits of MACsec address 130 to be stored in the LSB register (of the address register 126) and the second 16 bits in a follow-up command to be stored in the MSB register. The PHY 102 may then use the 16 bits from the LSB register and the 16 bits from the MSB register together to determine the 32 bit MACsec address 130 which may be used to determine which portion or address of the register space 116 and/or the memory space 118 from which data is to be read and/or to which data is to be written.

The PHY 102 may then execute, or provide to the MACsec function block 106, the command 110 on the register space 116 and/or memory space 118. The result of the execution may produce result 120, which may be returned from the MACsec function block 106 to the PHY 102. The result 120 may include the data read from the MACsec function block 106 (e.g., as a result of the read command 110A) or a confirmation of the data write command 110B that the MACsec data 132 has been written to the MACsec function block 106. The result 120 may then be returned to the CPU 104 via one or more MDIO bus transfers by one or more of the MDIO buses 108A, 108B, though as typically will be the case, the result 120 will be returned to the CPU 102 via the same MDIO bus 108A, 108B from which the corresponding command 110 was received.

As referenced above, the system 100 may include two or more MDIO buses 108A, 108B operating in parallel. The arbitration unit 122 may arbitrate access to the MACsec function block 106 to prevent data integrity issues that may arise from having two or more MDIO buses 108A, 108B operating simultaneously. For example, as discussed above, the PHY 102 may receive commands 110 over either or both of the MDIO buses 108A and 108B, these commands 110 may indicate read and/or write commands to the MACsec function block 106. The commands 110 when received by the PHY 102 may be provided to the arbitration unit 122. The arbitration unit 122 may then arbitrate access to the MACsec function block 106 between two or more commands received at the PHY 102.

For example, one method of arbitration may include providing access to the MACsec function block 106 based on which command was received first. Or for example, the commands 110 may be associated with a priority level, in which case higher priority commands may be provided access the MACsec function block 106 prior to lower priority commands. Or for example, write commands may be given priority over read commands or vice versa. In other example embodiments, other forms of arbitration may be used by the arbitration unit 122 to prevent the corruption or simultaneous access of data stored in the MACsec function block 106. In particular, the arbitration unit 122 prevents a read command 110A from executing simultaneously with a write command 110B both addressed to the same or overlapping address in the memory space 118.

As referenced above, the interface registers 114A, 114B may provide indirect access to the MACsec function block 106 to the CPU 104. In traditional implementations, without MACsec, the 32 registers of the interface register 114A may be used to store data, and may be where data is read or written based on the 5 bit address from the MDIO bus 108A. In the system 100 however, the registers of the interface registers 114A, 114B may be used to access the MACsec function block 106.

As noted above, interface register 114A may include, for example, a command register 124, the address register 126 and a data register 128. The command register 124 may store whether the command 110 includes a read command 110A or a write command 110B. The address register 126 may store a MACsec address 130 corresponding to a register space 116 and/or memory space 118 from the MACsec function block 106. The data register 128 may include MACsec data 132 that is provided by the CPU 104 (or other data source) and is to be written to (in the case of write commands 110B), the data register 128 may also store the result 120, which may include a confirmation as to whether the write command 110B was successfully executed. The data register 128, may store the MACsec data 132 read from the MACsec function block 106, in the case of read commands 110A.

According to an example embodiment, the data register 128, similar to the address register 126 as discussed above, may include multiple 16 bit registers, including for example, a LSB data register and a MSB data register. When the MACsec data 132 to be written to the MACsec function block 106 and/or read from the MACsec function block 106 exceeds the 32 bits of allocated data space in the data register 128. The system 100 may allow for multiple reads and writes to the data register 128. For example, if data read from the MACsec function block 106 is 64 bits long, then 16 bits may be written to the LSB data register and 16 bits may be written to the MSB data register. The 32 bits may then be read from the data register 128 and provided to the CPU 104 via the MDIO bus 108A. Then, the next 32 bits may be written to and read from the data register 128, and then again provided to the CPU 104 as the result 120.

The arbitration unit 122 may be associated with a timer 134. The timer 134 may include a timer that prevents a single command from accessing resources (e.g., the MACsec function bock 106) indefinitely. For example, there may be a read command 110A to a MACsec address 130 to a portion of the memory space 118 that has been powered down. Then for example, rather than waiting an indefinite or extended period of time, upon expiration of the timer 134 (which may be set to a shorter and/or more acceptable period of time in light of the throughput requirements of MACsec), the read command 110A may be timed-out and the next command 110 may be executed. According to an example embodiment, the timer 134 may issue an interrupt command that interrupts the MDIO command and notifies the CPU. The timer 134 may help reduce latency that may occur due to certain MDIO commands, and improve efficiency for MACsec.

According to an example embodiment, the system 100 may handle burst operations. Burst operations may include a read or write command 110 that accesses multiple register and/or memory addresses 130 at once. For example, rather than the CPU 104 issuing 3 read commands 110A to read data from three contiguous memory addresses 130, which may cause the PHY 102 to provide three read commands 110A to the MACsec function block 106 and receive three different results 120, the CPU 104 may issue a single burst read command 110. The burst read command 110 may include the beginning MACsec address 130 and the length or total number of memory space 118 locations to be read. Then for example, the MACsec function block may return all of the data from each specified memory location in the result 120 (or as multiple results 120) which may be provided back to the CPU 104 via the MDIO buses 108A, 108B. The burst operations (both read and write) may reduce not only latency (that may be caused by submitting multiple commands sequentially) but also allow for fewer and quicker memory space 118 accesses, that may be performed at the same time, thus further enabling MACsec to be implemented on the PHY 102 without latency issues that may plague traditional PHY systems.

An alternative to managing MACsec as described above in system 100 may be to use a peripheral component interconnect (PCI) bus in lieu of the multiple MDIO buses 108A, 108B used in the system 100. However, the problem with a PCI bus, though it may address some of the issues discussed above that plague a traditional PHY system, the cost of implementing a PCI bus may be greater than using multiple MDIO buses. For example, a PCI bus may use up to 60 pins to form a connection, while an MDIO bus may use fewer pins. According to an example embodiment, an MDIO interface may be implemented by using two pins, an MDIO pin and a management data clock (MDC) or timer pin.

Implementing MACsec on a layer 1 device such as the PHY 102, allows upper layer devices to remain the same or relatively unaffected while receiving the additional security provided by MACsec. As discussed above, in an OSI modeled network, higher layer devices may use the services provided by lower layer devices, including MACsec in the system 100. The system 100 retains the MDIO protocol communication that is currently prevalent in existing systems between layer 1 and layer 2 devices, while implementing the additional MACsec security with the MACsec function block 106.

Though the example system 100 was described in detail using MDIO and MACsec as example applications, it should be understood that the system 100 may be applied more widely and should be construed as being limited to those implementations. For example, the system 100 may be applied to any device which deploys only a low-performance serial mgmt interface, such as MDIO, and device requires larger address space, bigger register/memory width, and/or a higher management bandwidth or lower access latency.

Figure 2:
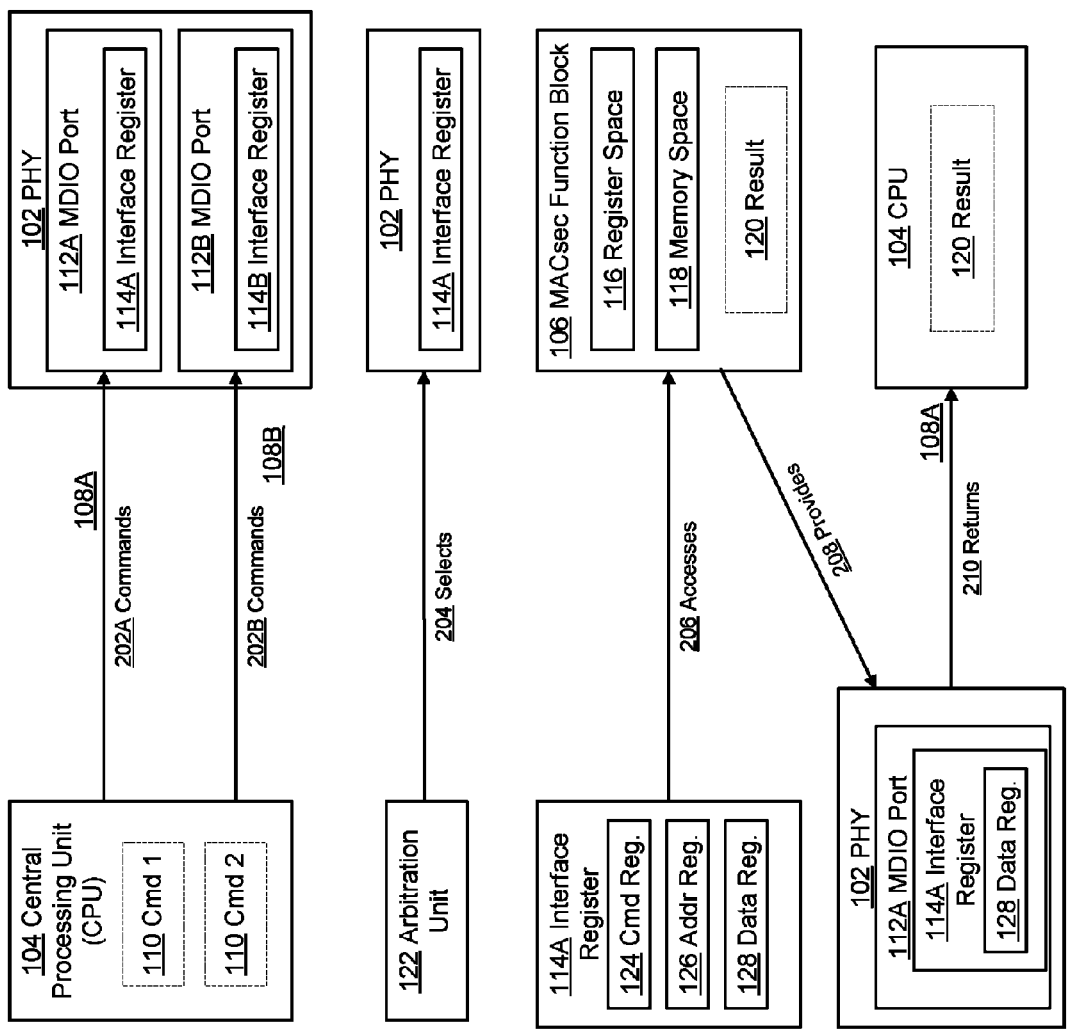
FIG. 2 is a timing diagram that illustrates operation of an example system that manages media access control security (MACsec) on a network.

FIG. 2 is a timing diagram that illustrates operation of an example system 100 that manages media access control security (MACsec) on a network. In operations 202A and 202B, the CPU 104 may command or provide the command 110 to the PHY 102 via the MDIO buses 108A and/or 108B. For example, the CPU 104 may provide two commands 110, command 1 and command 2 to PHY 102, which may be received at MDIO ports 112A and 112B, respectively. Each MDIO port 112A, 112B may be associated with or correspond to an interface register 114A, 114B.

In operation 204, the arbitration unit 122 may select which command 110 (e.g., command 1 or command 2) receives priority and/or access to the MACsec function block 106. The command 110 that receives greater priority may access the MACsec function block 106 first. In the example of FIG. 2, the arbitration unit 122 may select the command 1, which corresponds to and/or is stored in the first interface register 114A (e.g., in the command register 124). The address(es) that correspond to the command 1 may be stored in the address register 126, and the data (if any) corresponding to the command 1 may be stored in the data register 128.

In operation 206, the selected interface register 114A accesses the MACsec function block 106. For example, the information from the command register 124, address register 126 and data register 128 may be used to access the register space 116 and/or memory space 118 from the MACsec function block 106. The MACsec function block 106 may execute the selected or provided command 1.

In operation 208, the MACsec function block 106 provides a result 120 of the execution of the command. The PHY 102 may store the result 120 in the data register 128. In operation 208, the result 120 may be provided back to the CPU 104 via the MDIO bus 108A upon which the command 1 was received. If for example, the size of the result 120 was greater than the storage capacity of the data register 128, for example in burst commands, operations 208 and 210 may be repeated until the full result 120 has been passed from the MACsec function block 106 to the CPU 104. After the interface register 114A completes its interaction with the MACsec function block, the arbitration unit may allow the interface register 114B to access the MACsec function block to execute command 2.

Figure 3:
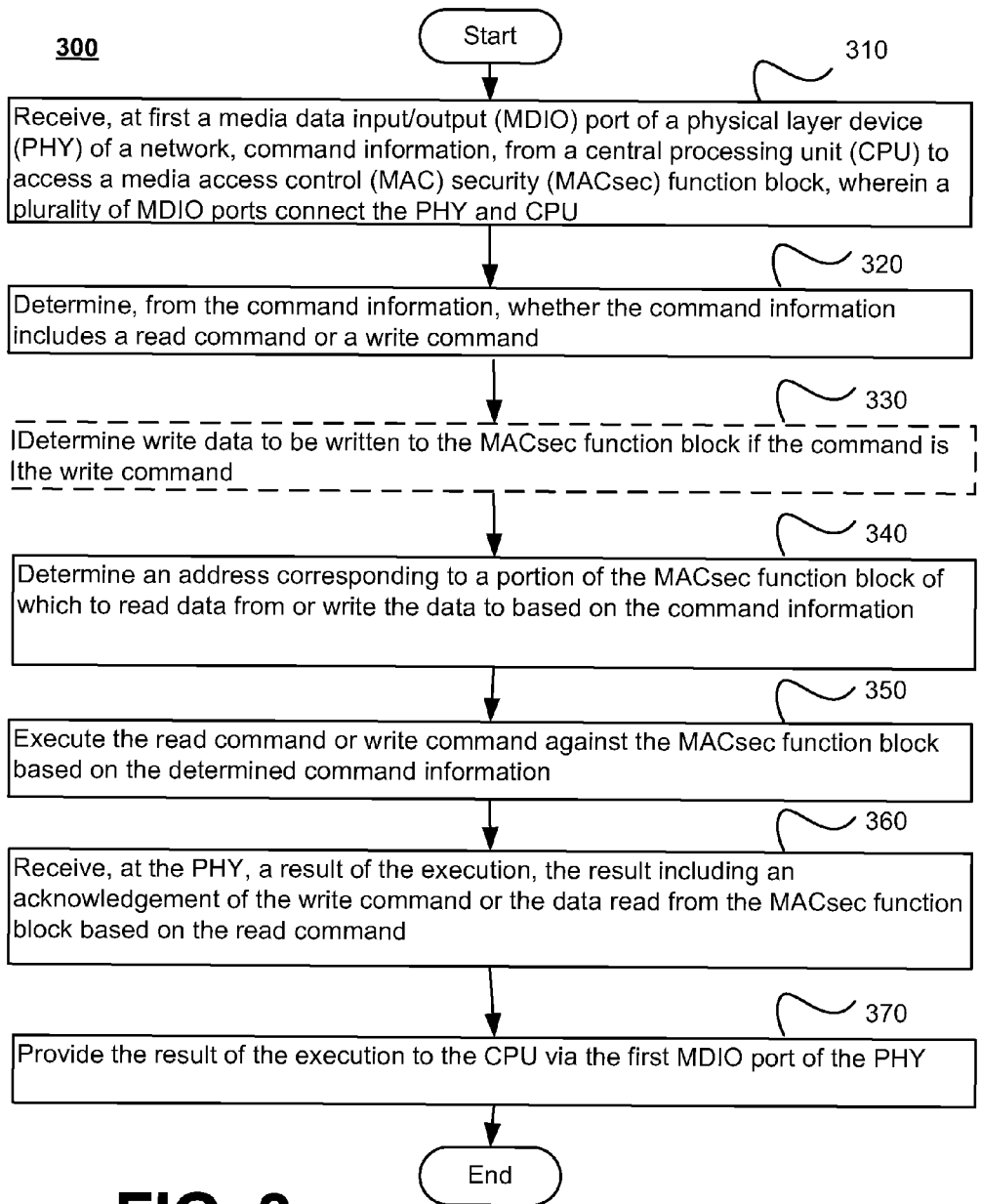
FIG. 3 is a flowchart illustrating example operations of the system of FIG. 1.

FIG. 3 is a flowchart 300 illustrating example operations of the system of FIG. 1. More specifically, FIG. 3 illustrates an operational flow 300 representing example operations related to managing MACsec in a physical layer device.

After a start operation, command information to access a media access control security (MACsec) function block may be received at a media data input/output (MDIO) port of a physical layer device (PHY) of a network from a central processing unit (CPU), wherein a plurality of MDIO ports connect the PHY and CPU (310). For example, as shown in FIG. 1, the PHY 102 may receive the command 110 at the MDIO port 112A from the CPU 104, wherein a plurality of MDIO ports 112A and 112B connect the PHY 102 and the CPU 104.

From the command information it may be determined whether the command information includes a read command or a write command (320). For example, the PHY 102 may determine from the command 110 whether it is a read command 110A or a write command 110B and store this determination in the command register 124.

From the command information, if the command is the write command, write data to be written to the MACsec function block may be determined (330). For example, if the command 110 is the write command 110B, the MACsec data 132 may be determined from the command information 110 and may be stored in the data register 128.

An address corresponding to a portion of the MACsec function block of which to read data from or write the data to may be determined based on the command information (340). For example, the PHY 102 may determine from the command 110, the MACsec address 130 to be read from and/or written to, and may store the MACsec address in the address register 126.

The read command or write command may be executed against the MACsec function block based on the determined command information (350). For example, the arbitration unit 122 may grant access to the interface register 114A to the MACsec function block 106. Then for example, the interface register 114A (and/or PHY 102) may provide the information from the command register 124, address register 126 and data register 128 to the MACsec function block 106 for execution. Or for example, the PHY 102 may execute the read command 110A or write command 110B against the MACsec function block 106.

A result of the execution may be received at the PHY, the result including an acknowledgement of the write command or the data read from the MACsec function block based on the read command (360). For example, the MACsec function block 106 may provide the result 120 of the execution to the PHY 102. The result 120 may be stored in the data register 128.

The result of the execution may be provided to the CPU via the MDIO port of the PHY (370). For example, the result 120 may be provided to the CPU 104 through the MDIO port 112A via the MDIO bus 108A.

In an example embodiment, the receiving command information operation (310) may include receiving first command information from the CPU at the first MDIO port of the PHY, the first MDIO port being associated with a first interface register configured to store the first command information; receiving second command information from the CPU at a second MDIO port of the PHY, wherein the second MDIO port operates in parallel with the first MDIO port, the second MDIO port being associated with a second interface register configured to store the second command information; and arbitrating access to the MACsec function block between the first interface register and the second interface register.

In an example embodiment, the executing operation (350) may include determining that a timer expires prior to a completion of the execution of the read command or write command, interrupting the read command or write command, and executing a subsequent command.

In an example embodiment, the executing operation (350) may include accessing a memory space of the MACsec function block corresponding to the address of a write command, retrieving data from the memory space into a register space of the MACsec function block, manipulating the data in the register space, and writing the manipulated data to the memory space.

In an example embodiment, the executing operation (350) may include accessing a memory space of the MACsec function block corresponding to the address of a read command, storing data from the memory space into a register space of the MACsec function block, and providing the data from the register space to the PHY as the result.

In an example embodiment, the determining operations (320 and 340) may include determining whether the command is a burst read command, wherein the burst read command indicates several portions of the MACsec function block which to read, determining an initial address of the MACsec function block at which to start the burst read command, and determining a data length corresponding to the burst read command.

In an example embodiment, the operations (310-370) may further include determining that a first interface register associated with a first MDIO port configured to store the command information is non-functional, determining that a second interface register associated with a second MDIO port configured to store the command information is functional, and resetting the first interface register, without impacting the second interface register.

According to an example embodiment, a system may include a media access control (MAC) security (MACsec) function block configured to implement MACsec protocols on a network; a physical layer device (PHY) connected to the MACsec function block, the PHY including an interface register configured to store command information for the MACsec function block; a central processing unit (CPU) configured to provide the command information for the MACsec function block to the PHY via a management data input/output (MDIO) bus. The PHY may be configured to execute either a read command or a write command against the MACsec function block based on the command information, receive, from the MACsec function block, a response corresponding to the execution of the read command or write command against the MACsec function block; and provide the response to the CPU via the MDIO bus.

In an example embodiment of the system, the MACsec function block may include a plurality of gigabit media independent interfaces (GMIIs).

In an example embodiment of the system, the MACsec function block may provide resources for the PHY that correspond to an institute of electrical and electronics engineers (IEEE) 802.1 AE standard for implementing the MACsec protocols on the network.

In an example embodiment of the system, the MACsec function block may enable the network to provide secure and encrypted communication on the network based on the MACsec protocols.

In an example embodiment of the system, the PHY may include two MDIO ports, each MDIO port may correspond to an interface register, wherein the CPU and PHY may communicate via the two MDIO ports operating in parallel.

In an example embodiment of the system, the PHY may include an arbitration unit configured to arbitrate access to the MACsec function block between two interface registers and select one of the interface registers to which to provide access to the MACsec function block.

In an example embodiment of the system, the MDIO bus may be configured to transmit 5 bits of address space between the CPU and the PHY, wherein the 5 bits of address space may correspond to a portion of an interface register of the PHY.

In an example embodiment of the system, the CPU may be configured to provide a MACsec address using the 5 bits of address space, wherein the PHY may be configured to store the MACsec address and map the MACsec address to a corresponding to a portion of the MACsec function block.

In an example embodiment of the system, the CPU may be configured to operate as an MDIO master and provide the command to the PHY that is configured to operate as an MDIO slave and execute the read or write command against the MACsec function block.

In an example embodiment of the system, the interface register may include a command register, an address register and a data register configured to store the command information.

In an example embodiment of the system, the data register may include two 16 bit registers in the interface register, and wherein the CPU is configured to perform multiple reads or writes for data, associated with the command, that occupies more than 32 bits.

In an example embodiment of the system, the address register may include two 16 bit address registers in the interface register, wherein the two 16 bit address registers may map to a 32-bit MACsec address of the MACsec function block.

According to an example embodiment, a system may include a physical layer device (PHY) of a network including a plurality of management data input/output (MDIO) ports operating in parallel, each MDIO port providing a communication pathway between the PHY and a central processing unit (CPU) via an MDIO bus. A central processing unit (CPU) may operate as a MDIO master device, configured to provide to the PHY, via the MDIO buses command information to access a media access control (MAC) security (MACsec) function block. An interface register may correspond to each MDIO port, each interface register comprising a command register, an address register, and a data register configured to store the command information. The MACsec function block may provide resources accessible to the CPU via the PHY to enable security protocols on a network, the MACsec function block may include memory space and register space accessible by the PHY to execute a read or write command based on the command information. An arbitration unit may be configured to arbitrate access to the MACsec function block between the interface registers of each MDIO port. The PHY may be configured to receive a result to an execution of the read command or write command against the MACsec function block, and provide the result to the CPU via the MDIO bus on which the command information was received.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A system comprising:
a media access control (MAC) security (MACsec) function block configured to implement MACsec protocols on a network;
a physical layer device (PHY) connected to the MACsec function block, the PHY including an interface register configured to store command information for the MACsec function block;
a central processing unit (CPU) configured to provide the command information for the MACsec function block to the PHY via a management data input/output (MDIO) bus;
wherein the PHY is configured to:
execute either a read command or a write command against the MACsec function block based on the command information,
receive, from the MACsec function block, a response corresponding to the execution of the read command or write command against the MACsec function block; and
provide the response to the CPU via the MDIO bus;
wherein the interface register includes at least a command register, an address register and a data register configured to store the command information, wherein the data register comprises two 16 bit registers in the interface register, and wherein the CPU is configured to perform multiple reads or writes for data, associated with the command, that occupies more than 32 bits.

2. The system of claim 1, wherein the MACsec function block comprises a plurality of gigabit media independent interfaces (GMIIs).

3. The system of claim 1, wherein the MACsec function block provides resources for the PHY that correspond to an institute of electrical and electronics engineers (IEEE) 802.1 AE standard for implementing the MACsec protocols on the network.

4. The system of claim 1, wherein the MACsec function block enables the network to provide secure and encrypted communication on the network based on the MACsec protocols.

5. The system of claim 1, wherein the PHY includes two MDIO ports, each MDIO port corresponding to an interface register, wherein the CPU and PHY communicate via the two MDIO ports operating in parallel.

6. The system of claim 5, wherein the PHY comprises an arbitration unit configured to arbitrate access to the MACsec function block between the two interface registers and select one of the interface registers to which to provide access to the MACsec function block.

7. The system of claim 1, wherein the MDIO bus is configured to transmit 5 bits of address space between the CPU and the PHY, wherein the 5 bits of address space correspond to a portion of an interface register of the PHY.

8. The system of claim 7, wherein the CPU is configured to provide a MACsec address using the 5 bits of address space, wherein the PHY is configured to store the MACsec address and map the MACsec address to a corresponding to a portion of the MACsec function block.

9. The system of claim 1, wherein the CPU is configured to operate as an MDIO master and provide the command to the PHY that is configured to operate as an MDIO slave and execute the read or write command against the MACsec function block.

10. A method comprising:
receiving, at a first media data input/output (MDIO) port of a physical layer device (PHY) of a network, command information, from a central processing unit (CPU) to access a media access control (MAC) security (MACsec) function block, wherein a plurality of MDIO ports connect the PHY and CPU;
determining from the command information:
whether the command information includes a read command or a write command,
if the command is the write command, write data to be written to the MACsec function block, and
the length of the data to be read or written, and
an address corresponding to a portion of the MACsec function block of which to read data from or write the data to based on the command information;
executing the read command or write command against the MACsec function block based on the determined command information;
receiving, at the PHY, a result of the execution, the result including an acknowledgement of the write command or the data read from the MACsec function block based on the read command; and
providing the result of the execution to the CPU via the first MDIO port of the PHY;
wherein the determining includes:
determining whether the command is a burst read command, wherein the burst read command indicates several portions of the MACsec function block which to read;
determining an initial address of the MACsec function block at which to start the burst read command; and
determining a data length corresponding to the burst read command.

11. The method of claim 10, wherein the receiving the command information comprises:
receiving first command information from the CPU at the first MDIO port of the PHY, the first MDIO port being associated with a first interface register configured to store the first command information;
receiving second command information from the CPU at a second MDIO port of the PHY, wherein the second MDIO port operates in parallel with the first MDIO port, the second MDIO port being associated with a second interface register configured to store the second command information; and
arbitrating access to the MACsec function block between the first interface register and the second interface register.

12. The method of claim 10, wherein the executing comprises:
determining that a timer expires prior to a completion of the execution of the read command or write command;
interrupting the read command or write command;
notifying the CPU that the execution failed; and
executing a subsequent command.

13. The method of claim 10, wherein the executing comprises:
accessing a memory space of the MACsec function block corresponding to the address of a write command;
retrieving data from the memory space into a register space of the MACsec function block;
manipulating the data in the register space; and
writing the manipulated data to the memory space.

14. The method of claim 10, wherein the executing comprises:
accessing a memory space of the MACsec function block corresponding to the address of a read command;
storing data from the memory space into a register space of the MACsec function block; and providing the data from the register space to the PHY as the result.

15. The method of claim 11 further comprising:
determining that a first interface register associated with a first MDIO port configured to store the command information is non-functional;
determining that a second interface register associated with a second MDIO port configured to store the command information is functional; and
resetting the first interface register, without impacting the second interface register.

16. A system comprising:
a media access control (MAC) security (MACsec) function block configured to implement MACsec protocols on a network;
a physical layer device (PHY) connected to the MACsec function block, the PHY including an interface register configured to store command information for the MACsec function block;
a central processing unit (CPU) configured to provide the command information for the MACsec function block to the PHY via a management data input/output (MDIO) bus;
wherein the PHY is configured to execute either a read command or a write command against the MACsec function block based on the command information,
wherein the interface register includes at least a command register, an address register and a data register configured to store the command information, wherein the data register comprises two 16 bit registers in the interface register, and wherein the CPU is configured to perform multiple reads or writes for data, associated with the command, that occupies more than 32 bits.

17. The system of claim 16, wherein the MACsec function block enables the network to provide secure and encrypted communication on the network based on the MACsec protocols.

18. The system of claim 16, wherein the PHY includes two MDIO ports, each MDIO port corresponding to an interface register, wherein the CPU and PHY communicate via the two MDIO ports operating in parallel.

19. The system of claim 18, wherein the PHY comprises an arbitration unit configured to arbitrate access to the MACsec function block between the two interface registers and select one of the interface registers to which to provide access to the MACsec function block.

20. The system of claim 16, wherein the MDIO bus is configured to transmit 5 bits of address space between the CPU and the PHY, wherein the 5 bits of address space correspond to a portion of an interface register of the PHY.

21. The system of claim 20, wherein the CPU is configured to provide a MACsec address using the 5 bits of address space, wherein the PHY is configured to store the MACsec address and map the MACsec address to a corresponding to a portion of the MACsec function block.

22. The system of claim 16, wherein the CPU is configured to operate as an MDIO master and provide the command to the PHY that is configured to operate as an MDIO slave and execute the read or write command against the MACsec function block.

23. A method comprising:
receiving, at a first media data input/output (MDIO) port of a physical layer device (PHY) of a network, command information, from a central processing unit (CPU) to access a media access control (MAC) security (MACsec) function block, wherein a plurality of MDIO ports connect the PHY and CPU;
determining from the command information:
whether the command information includes a read command or a write command,
if the command is the write command, write data to be written to multiple portions of the MACsec function block, and
the length of the data to be read or written, and
an address corresponding to a portion of the MACsec function block of which to read data from or write the data to based on the command information;
executing the read command or write command against the MACsec function block based on the determined command information;
receiving, at the PHY, a result of the execution, the result including an acknowledgement of the write command or the data read from the MACsec function block based on the read command; and
providing the result of the execution to the CPU via the first MDIO port of the PHY;
wherein the determining includes:
wherein the determining comprises:
determining whether the command is a burst write command, wherein the burst write command indicates several portions of the MACsec function block which to write;
determining an initial address of the MACsec function block at which to start the burst write command;
determining a data length corresponding to the burst write command; and
determining the write data to be written.

\* \* \* \* \*